US008380628B1

(12) United States Patent
Harris

(10) Patent No.: US 8,380,628 B1
(45) Date of Patent: *Feb. 19, 2013

(54) SYSTEM AND METHOD FOR VERIFYING COMMERCIAL TRANSACTIONS

(75) Inventor: David N. Harris, Sonora, CA (US)

(73) Assignee: Harris Intellectual Property, LP, Sonora, CA (US)

( * ) Notice: Subject to any disclaimer, the term of this patent is extended or adjusted under 35 U.S.C. 154(b) by 1635 days.

This patent is subject to a terminal disclaimer.

(21) Appl. No.: 09/617,361

(22) Filed: Jul. 17, 2000

(51) Int. Cl.
G06Q 30/00 (2012.01)

(52) U.S. Cl. ... 705/44; 705/26.1; 705/26.35; 705/26.82; 340/5.4

(58) Field of Classification Search ............ 705/26, 705/75, 44, 26.1, 26.35, 26.82, 444; 340/5.4, 340/5.41; 379/114.14; 455/406–411
See application file for complete search history.

(56) References Cited

U.S. PATENT DOCUMENTS

| 3,287,839 | A |   | 11/1966 | Rotwein et al. |           |
|-----------|---|---|---------|----------------|-----------|
| 4,593,936 | A |   | 6/1986  | Opel           |           |
| 4,614,861 | A |   | 9/1986  | Pavlov et al.  |           |
| 5,104,149 | A |   | 4/1992  | Hoppe          |           |
| 5,355,411 | A |   | 10/1994 | MacDonald      |           |
| 5,473,144 | A |   | 12/1995 | Mathurin, Jr.  |           |
| 5,485,510 | A |   | 1/1996  | Colbert        | 379/145   |
| 5,575,508 | A |   | 11/1996 | Diamond        |           |
| 5,671,279 | A |   | 9/1997  | Elgamal        | 380/23    |
| 5,708,422 | A | * | 1/1998  | Blonder et al. | 340/5.41  |
| 5,715,399 | A |   | 2/1998  | Bezos          | 395/227   |
| 5,826,245 | A |   | 10/1998 | Sandberg-Diment | 705/44   |
| 5,883,810 | A |   | 3/1999  | Franklin et al. | 364/479.02 |
| 5,903,721 | A |   | 5/1999  | Sixtus         | 395/187.01 |
| 5,903,830 | A |   | 5/1999  | Joao et al.    | 455/406   |
| 5,953,710 | A |   | 9/1999  | Fleming        |           |
| 5,991,738 | A |   | 11/1999 | Ogram          | 705/26    |
| 6,000,832 | A |   | 12/1999 | Franklin et al. | 364/479.02 |
| 6,012,144 | A |   | 1/2000  | Pickett        | 713/201   |

(Continued)

FOREIGN PATENT DOCUMENTS

CN 1418351 A 5/2003
EP 0 745 961 A2 12/1996

(Continued)

OTHER PUBLICATIONS

Dialog reference, file 9 #0019808924 Certificate Manager v3.0 the most Flexible Approach to digital Certificate and Smart Card Production to Date; Increased Interoperability Provides a cost effective and Mnageable Solution for High-volume Production.*

(Continued)

Primary Examiner — Raquel Alvarez
(74) Attorney, Agent, or Firm — Larry E. Henneman, Jr.; Henneman & Associates PLC

(57) ABSTRACT

A system and method is disclosed for verifying a commercial transaction between a card-holder, a merchant, and a credit card company. The card-holder makes a purchase with the merchant using a full credit card number. The merchant submits a transaction approval request for approval with the credit card company. The credit card company executes conventional credit approval of the transaction approval request, as well as verifies the transaction approval request with the card-holder. An approval is sent to the merchant only after the transaction approval request is both conventionally approved by the credit card company and verified by the card-holder. The card-holder, or the credit card company, may initiate verification of the transaction approval request.

18 Claims, 10 Drawing Sheets

U.S. PATENT DOCUMENTS

| | | | | |
|---|---|---|---|---|
| 6,047,270 | A | | 4/2000 | Joao et al. ............... 705/44 |
| 6,055,505 | A | * | 4/2000 | Elston ................... 705/1 |
| 6,064,990 | A | * | 5/2000 | Goldsmith ............ 705/44 X |
| 6,088,683 | A | | 7/2000 | Jalili ................... 705/26 |
| 6,233,565 | B1 | * | 5/2001 | Lewis et al. ............ 705/35 |
| 6,282,522 | B1 | | 8/2001 | Davis et al. ............ 705/41 |
| 6,339,766 | B1 | | 1/2002 | Gephart |
| 6,422,462 | B1 | * | 7/2002 | Cohen ................. 235/381 |
| 6,529,725 | B1 | * | 3/2003 | Joao et al. ............ 455/406 |
| 7,096,003 | B2 | | 8/2006 | Joao et al. |
| 7,264,154 | B2 | | 9/2007 | Harris |
| 7,702,578 | B2 | | 4/2010 | Fung et al. |
| 2001/0047330 | A1 | | 11/2001 | Gephart et al. |
| 2002/0143570 | A1 | | 10/2002 | Tobita |
| 2002/0169720 | A1 | | 11/2002 | Wilson et al. |
| 2004/0078325 | A1 | | 4/2004 | O'Connor |
| 2004/0133507 | A1 | | 7/2004 | Barbour |
| 2004/0148259 | A1 | | 7/2004 | Reiners et al. |
| 2005/0029349 | A1 | | 2/2005 | McGregor et al. |
| 2005/0242193 | A1 | | 11/2005 | Smith et al. |
| 2006/0261152 | A1 | | 11/2006 | Wong |

FOREIGN PATENT DOCUMENTS

| | | | |
|---|---|---|---|
| EP | 1 006 469 | A1 | 12/1998 |
| JP | 08-339407 | A | 12/1996 |
| JP | 10-105627 | A | 4/1998 |
| JP | 11-250193 | A | 9/1999 |
| JP | 2000-306161 | A | 11/2000 |
| JP | 2001-283118 | A | 10/2001 |
| JP | 2001-351050 | A | 12/2001 |
| JP | 2002-298045 | A | 10/2002 |
| JP | 2002-324219 | A | 11/2002 |
| KR | 2000-0024216 | A | 1/2000 |
| KR | 2000-0037355 | A | 4/2000 |
| KR | 10-2004-0072447 | A | 8/2004 |
| WO | 10-105627 | A | 4/1998 |
| WO | WO 00/33497 | A2 | 6/2000 |
| WO | WO 00/49586 | A1 | 8/2000 |
| WO | WO 01/61640 | A1 | 8/2001 |
| WO | WO 03/023560 | A2 | 3/2003 |

OTHER PUBLICATIONS

Boards of Appeal of the European Patent Office / Datasheet for the Decision of Dec. 13, 2006 regarding: Case No. T 1227/05-3.5.01 (EP App. No. 01964907.8).
Introduction of Credit Card that a User Can Set Up a Use Environment, Pack, Jong Min, Naver News, Oct. 30, 2003.
PCT Application No. PCT/US2001/022313, International Search Report dated Oct. 9, 2001.
PCT Application No. PCT/US2001/022313, Written Opinion dated Jul. 24, 2003.
PCT Application No. PCT/US2001/022313, International Preliminary Report on Patentability dated Dec. 15, 2003.
AU Application No. 2001273490, Office Action dated Aug. 10, 2006.
AU Application No. 2001273490, Office Action dated Jul. 19, 2007.
AU Application No. 2001273490, Office Action dated May 7, 2008.
AU Application No. 2008202099, Office Action dated Dec. 9, 2008.
AU Application No. 2008202099, Office Action dated Dec. 10, 2009.
CA Application No. 2,415,366, Office Action dated Jan. 11, 2012.
CN Application No. 01812985.4, Office Action dated May 28, 2004 (English translation).
CN Application No. 01812985.4, Notice of Allowance dated Jan. 14, 2005 (English translation).
EP Application No. 01 952 770.04-2221, European Search Report dated Jun. 25, 2007.
EP Application No. 01 952 770.04-2221, Office Action dated Sep. 13, 2007.
EP Application No. 01 952 770.04-2221, Office Action dated Apr. 24, 2008.
JP Application No. 2002-514625, Office Action dated May 16, 2011 (English translation).
JP Application No. 2002-514625, Office Action dated Nov. 16, 2011 (English translation).
KR Application No. 7017899/2002, Office Action dated Aug. 24, 2007 (English translation).
KR Application No. 7017899/2002, Notice of Allowance dated May 30, 2008 (English translation).
NZ Application No. 523746, Office Action dated Jan. 29, 2004.
NZ Application No. 523746, Notice of Allowance dated Oct. 12, 2004.
U.S. Appl. No. 09/760,271, Office Action dated Jul. 14, 2004.
U.S. Appl. No. 09/760,271, Office Action dated Feb. 14, 2005.
U.S. Appl. No. 09/760,271, Advisory Action dated Jul. 5, 2005.
U.S. Appl. No. 09/760,271, Office Action dated Dec. 15, 2005.
U.S. Appl. No. 09/760,271, Office Action dated Aug. 24, 2006.
U.S. Appl. No. 09/760,271, Office Action dated May 1, 2007.
U.S. Appl. No. 09/760,271, Notice of Appeal and Applicant's Appeal Brief dated Nov. 1, 2007.
U.S. Appl. No. 09/760,271, Notice of Appeal Brief Rejection dated Nov. 21, 2007.
U.S. Appl. No. 09/760,271, Applicant's Amended Appeal Brief dated Dec. 21, 2007.
U.S. Appl. No. 09/760,271, Examiner's Answer to Appeal Brief dated Mar. 26, 2008.
U.S. Appl. No. 09/760,271, Applicant's Reply Brief dated May 23, 2008.
U.S. Appl. No. 09/760,271, Notice of Reply Brief Accepted dated Jul. 24, 2008.
U.S. Appl. No. 09/760,271, PTO Decision dated Jun. 29, 2009.
U.S. Appl. No. 09/760,271, Examiner's Answer to Appeal Brief dated Aug. 6, 2009.
U.S. Appl. No. 09/760,271, Granted Appeal Brief Notice dated Nov. 19, 2009.
U.S. Appl. No. 09/760,271, Office Communication dated Jun. 29, 2011.
U.S. Appl. No. 09/760,271, Notice of Abandonment dated Sep. 8, 2011.
U.S. Appl. No. 09/760,271, Notice of Granted Petition to Revive Application dated Nov. 23, 2011.
U.S. Appl. No. 09/760,271, Office Action dated Jan. 10, 2012.
U.S. Appl. No. 10/889,227, Restriction Requirement dated Sep. 19, 2006.
U.S. Appl. No. 10/889,227, Office Action dated Jan. 19, 2007.
U.S. Appl. No. 10/889,227, Notice of Allowance dated Jun. 15, 2007.
PCT Application No. PCT/US2005/024242, International Search Report and Written Opinion dated Feb. 12, 2007.
PCT Application No. PCT/US2005/024242, International Preliminary Report on Patentability dated Apr. 12, 2007.
AU Application No. 2005271884, Office Action dated Apr. 9, 2010.
AU Application No. 2005271884, Notice of Allowance dated Mar. 9, 2011.
CN Application No. 200580030587.X, Office Action dated Feb. 12, 2010 (English translation).
CN Application No. 200580030587.X, Office Action dated Jul. 7, 2011 (English translation).
CN Application No. 201010239623.6, Office Action dated May 17, 2011 (English translation).
EP Application No. 05 769 377.2, European Search Report dated Feb. 16, 2010.
EP Application No. 05 769 377.2, Office Action dated Jul. 10, 2010.
IL Application No. 180640, Office Action dated Jan. 31, 2010 (English translation).
IN Application No. 379/DELNP/2007, Office Action dated Mar. 7, 2011 (English translation).
JP Application No. 2007-521513, Office Action dated Jul. 6, 2011 (English translation).
JP Application No. 2007-521513, Office Action dated Feb. 1, 2012 (English translation).
KR Application No. 7002939/2007, Office Action dated Oct. 17, 2011 (English translation).
MX Application No. MX/A/2007/000484, Office Action dated Jun. 3, 2009 (English translation).
MX Application No. MX/A/2007/000484, Office Action dated Dec. 15, 2009 (English translation).
MX Application No. MX/A/2007/000484, Notice of Allowance dated May 24, 2010 (English translation).

NZ Application No. 552703, Office Action dated Aug. 11, 2008.
NZ Application No. 552703, Office Action dated Aug. 18, 2009.
NZ Application No. 552703, Office Action dated Nov. 19, 2009.
NZ Application No. 552703, Notice of Allowance dated Mar. 10, 2010.
U.S. Appl. No. 11/895,837, Office Action dated Jun. 12, 2008.
U.S. Appl. No. 11/895,837, Office Action dated Mar. 9, 2009.
U.S. Appl. No. 11/895,837, Notice of Allowance dated Jan. 11, 2010.
U.S. Appl. No. 11/895,837, Office Communication dated Jun. 9, 2010.
U.S. Appl. No. 12/803,219, Office Action dated Aug. 31, 2010.
U.S. Appl. No. 12/803,219, Office Action dated May 9, 2011.
U.S. Appl. No. 12/803,219, Notice of Allowance dated Aug. 8, 2011.
U.S. Appl. No. 13/300,142, Office Action dated Apr. 2, 2012.
CN Application No. 201010239623.6, Office Action dated Jun. 1, 2012 (English translation).

* cited by examiner

SYSTEM AND METHOD FOR VERIFYING COMMERCIAL TRANSACTIONS

BACKGROUND

1. Field of the Invention

This invention relates generally to electronic commerce, and more particularly to a system and method for providing secure electronic transactions. Even more particularly, the present invention relates a system and method for facilitating verification of an electronic purchase by an account holder.

2. Description of the Background

Electronic commerce, buying and selling by electronic means, has become commonplace in modern society. With the mainstreaming of the Internet (most specifically the World Wide Web), electronic commerce has made its way into the home or office of any person with a computer. For several reasons, more and more people are choosing to do business (e.g. shopping) from their home or office computer. For example, consumers are attracted to Internet commerce because Internet based businesses typically offer items at discounted prices. In addition, the Internet is accessible twenty-four hours a day, enabling the consumer to make purchases at their convenience.

The primary means of payment for most consumer electronic purchases is a credit card. The credit card represents a prearranged credit account of the card-holder. The card-holder makes an electronic purchase with a merchant, using a credit card. The merchant submits the purchase request (including transmitting the entire credit card number) to the credit card company for purchase authorization. The credit card company then authorizes or denies the credit card transaction with the merchant. If the purchase is approved the prearranged credit account is debited in the amount of the purchase.

Credit cards offer many advantages to card-holders. For example, persons having access to a credit card spend less time at the bank, as well as, balancing checking and savings accounts. In addition, a credit card eliminates the need to carry large sums of cash. Further, purchase approval is automated when using a credit card while purchase approval with check or money order is delayed. Therefore, when making a purchase by phone or mail order, using a credit card eliminates the delay associated with sending payment through the mail.

As a result of increased electronic commerce, credit card security has become a major concern for card-holders. Some card-holders are wary of purchasing items over the Internet using their credit cards for fear of interception and unauthorized use of their credit card number. Their fears are justified because the language, in which most Internet web pages are written, HyperText Markup Language (HTML), uses vulnerable methods of transferring information. To combat Internet security issues some merchant networks use encryption techniques to secure transactions made over the Internet. This offers little comfort to the concerned consumer, because such encryption techniques can be deciphered by sophisticated criminals. Further, even if the transmission of the credit card number is secure, the card number is still stored on the receiving computer, and could be stolen by breaking into that computer. Additionally, credit card numbers can be stolen directly from the card by such devices as pocket scanners used by dishonest waiters, store clerks and the like.

Some commercial accounts (e.g. checking accounts) offer debit cards that face the same, if not increased, security risks as credit cards. Debit cards are similar to credit cards, however to complete a debit transaction, the card-holder's Personal Identification Number (PIN) must be given in addition to the card number at the time of purchase. In addition, the debit card draws funds from the account (typically a checking account) that it is linked to. In many cases the PIN given with debit card transactions is the same PIN used to access (e.g. via ATM machine or phone) the account that the debit card is linked to. If a purchase transaction made using a debit card is intercepted and used fraudulently, the thief has the ability to both make purchases using the debit card number and PIN, as well as, draw funds directly from the associated debit account.

The concern for improved credit card safety has put pressure on credit card companies and merchants to provide methods of ensuring secure electronic transactions. For example, U.S. Pat. No. 6,012,144 (Pickett) describes a method of maintaining Internet credit card transaction security by splitting the credit card number into two pieces and storing each piece on a separate data storage device of one or more server computers. The card-holder decides which portions of the credit card number will be sent to each storage device and then secures several processing codes (passwords). The processing codes are later obtained from the card-holder by an automated telephone call so that the purchase may be verified. There are several disadvantages to this methodology. First, Pickett's method is extremely time consuming for the card-holder because the full credit card number is not transmitted to the merchant in its entirety. Rather, the card-holder must parse the credit card number and calculate a slicing code. In addition, the card-holder must remember the slicing code, which may be different for each transaction, in order to verify the transaction. Further, the burden of providing the security software falls on the merchant, which may or may not be willing to provide such a system. Thus, no security is provided if the card-holder wishes to purchase from a merchant without such a system.

U.S. Pat. No. 5,903,721 (Sixtus) describes an alternate method of providing improved credit card transaction security. The method of Sixtus involves a card-holder making a purchase over the Internet. A "trust server", used to verify the card-holder, receives a purchase request along with the card-holder's IP (Internet Protocol) address. If the IP address received by the trust server matches a registered IP address for that card-holder, the purchase is verified and forwarded to a "Credit Clearinghouse" where the purchase is approved or disapproved. While no sensitive credit card information is transmitted over an unsecured network, transactions can only be made from the computer having the IP address registered with the trust server. In addition, some Internet Service Providers (ISP) use dynamic IP addressing, wherein a temporary IP address is assigned as the user logs onto the ISP's network. Thus, a card-holder having an Internet Service Provider that utilizes dynamic IP addressing is unable to use the transaction security system taught by Sixtus.

As another example, U.S. Pat. No. 5,991,738 (Ogram) teaches a method utilizing encryption software. A card-holder, wishing to purchase an item from a merchant employing Ogram's methodology, downloads encryption software from the merchant computer. The encryption software encodes any sensitive information before transmission to the merchant. One disadvantage of Ogram's methodology is the lack of a secured purchase verification process with the card-holder. In addition, the employed encryption techniques can be intercepted and deciphered during transmission.

What is needed is a system and method for providing safe and secure credit card transaction processing. What is also needed is a system and method for providing safe and secure credit card transactions that are transparent to merchants.

What is also needed is a system and method for facilitating card-holder verification of credit card transactions and providing prompt notice of each attempted use of a card-holder's credit card.

SUMMARY

The present invention overcomes the problems associated with the prior art by providing a system and method for providing safe and secure credit card transaction processing which is transparent to the merchant. The invention facilitates card-holder verification of each credit card transaction prior to transmitting an approval to the merchant, and provides prompt notice of each attempted use of the credit card to the account-holder.

A computer system is disclosed, for processing a commercial transaction between an account-holder and a merchant, comprising a processing unit to execute data and code, and a memory device for storing data and code. The stored and executed code includes a merchant communications module operative to receive a transaction approval request, including an entire account number, an account-holder communications module operative to facilitate a separate connection with the account-holder for verifying the received transaction approval request, and an authorization module responsive to the transaction approval request and operative to transmit an approval to the merchant only if the transaction approval request is verified by the account-holder.

In a particular embodiment, the authorization module includes an interactive verification module, responsive to the receipt of a transaction approval request and operative to initiate a connection with the account-holder. In a more particular embodiment, the computer system further includes a network interface, and the interactive verification module is operative to transmit an electronic message to the account-holder via the network interface, and is further operative to verify the transaction approval request upon receipt of a reply to the transmitted electronic message.

In another particular embodiment, the computer system further comprises a tele-communications device and the interactive verification module is operative to place an automated telephone call to the account-holder, recite a portion of the transaction approval request to the account-holder, and receive verification instructions from the account holder. In a more particular embodiment, the interactive verification module is operative to require an authentication code before reciting a portion of the transaction approval request.

Optionally, the interactive verification module waits for the account-holder to initiate communication with the system. Alternatively, the system initiates communication with the account-holder to verify pending transaction approval requests.

In a particular embodiment, the authorization module, responsive to instructions from the account holder, can selectively disable the verification process by automatically verifying subsequent transaction approval requests without further input from the account holder.

In yet another particular embodiment, the authorization module includes a master verification module that automatically disclaims a transaction approval request if the account holder has not verified the transaction approval request prior to the lapse of a predetermined time period. The master verification module is further operative to transmit notice to the account holder when the transaction approval request is disclaimed.

In yet another particular embodiment, a transaction approval request comprises a verification request from a third party financial institution, and the authorization module is operative to transmit indicia of verification to the third party financial institution.

A method is also disclosed for providing safe and secure commercial transactions between an account-holder and a merchant. The method includes receiving a transaction approval request including a full account number identifying the account-holders account, electronically verifying the transaction approval request with the account-holder via a separate communication from the merchant, and transmitting an approval to the merchant only if the transaction approval request is verified by the account-holder.

In a particular method, the step of verifying the transaction approval request with the account-holder includes prompting the account-holder to verify the transaction approval request. In a more particular method, prompting the account-holder includes sending an electronic message. In yet a more particular method, the step of verifying the transaction approval request includes receiving a reply to the electronic message. In another particular method, prompting the account-holder includes placing an automated telephone call to the account-holder, establishing a connection with the account-holder, reciting at least a portion of the transaction approval request, and receiving verification instructions from the account-holder. In an even more particular method, the account holder is authenticated before the recitation of at least a portion of the transaction approval request.

An alternate method includes waiting for the account-holder to initiate the verification process by communicating with the computer system. In a particular method verification is initiated by the account-holder over a network or a telephone connection and includes, receiving a connection request from the account-holder via a network or telecommunications device, establishing a connection with the account-holder, authenticating the account-holder, transmitting at least a portion of the transaction approval request to the account-holder, and receiving verification instructions from the account-holder with respect to the transaction approval request.

Optionally, the verification process can be selectively enabled or disabled by the account holder.

In another particular method, the step of electronically verifying the transaction approval request includes disclaiming the transaction approval request if the account holder does not verify the transaction approval request within a predetermined time interval. In a more particular method notice is transmitted to the account-holder when the transaction approval request has been disclaimed.

In yet another particular method, the step of receiving a transaction approval request from the merchant comprises receiving a verification request from a third party financial institution that received the transaction approval request from the merchant. The step of transmitting an approval to the merchant comprises transmitting indicia of verification to the third-party financial institution.

BRIEF DESCRIPTION OF THE DRAWINGS

The present invention is descried with reference to the following drawings, wherein like reference numbers denote substantially similar elements.

DETAILED DESCRIPTION

The present invention overcomes the problems associated with the prior art, by providing a novel system and method of providing safe and secure electronic transactions by verifying each electronic transaction with the account-holder. In the following description, numerous specific details are set forth (e.g. verification processed by credit card company, verification initiated by card-holder, etc.) in order to provide a thorough understanding of the invention. Those skilled in the art will recognize, however, that the invention may be practiced apart from these specific details. In other instances, details of well-known electronic commerce practices (e.g. electronic credit request/approval processes, computer operating systems, communication software, etc.) have been omitted, so as not to unnecessarily obscure the present invention.

Figure 1:
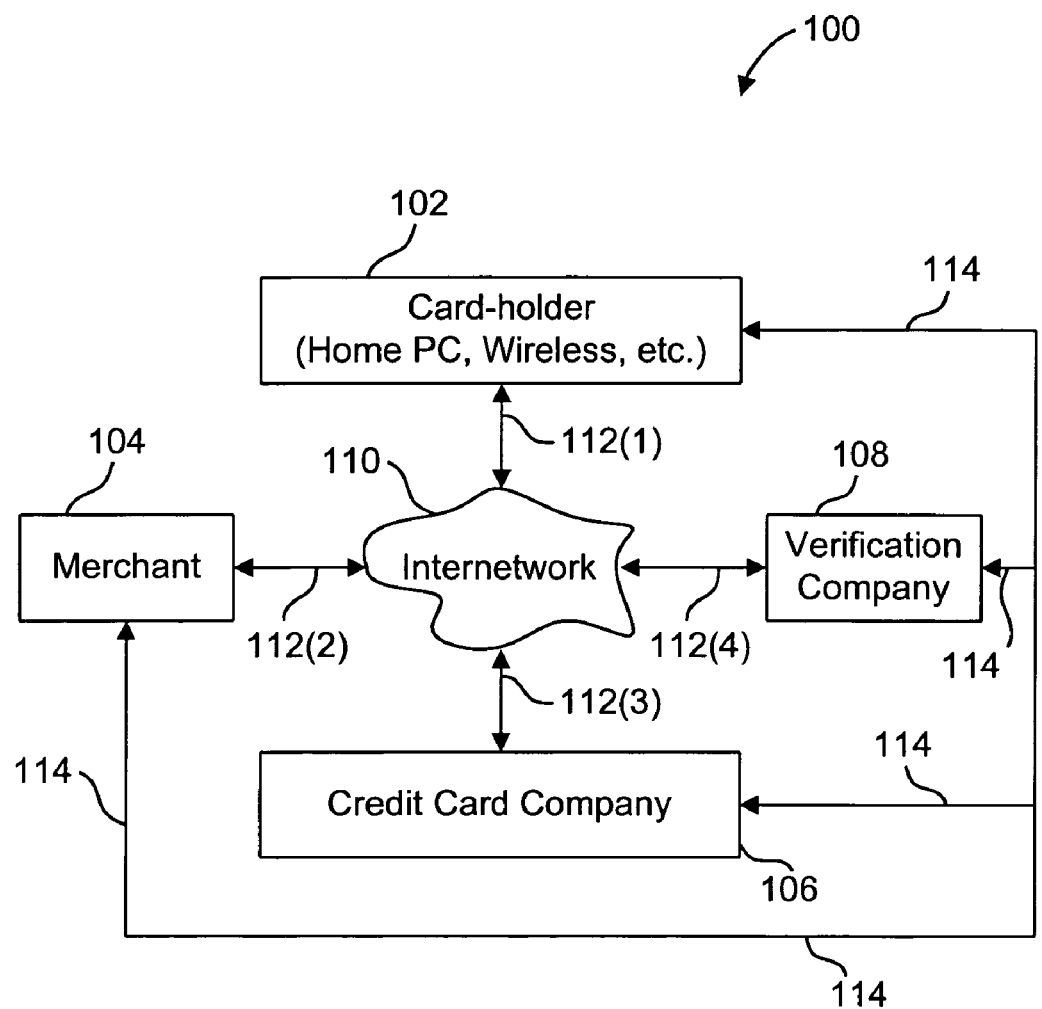
FIG. 1 is a block diagram of an internetwork between, a card-holder, a merchant, a credit card company, and a third party verification company according to the present invention.

FIG. 1 is a block diagram showing a system 100 including a card-holder 102, a merchant 104, a credit card company 106, and a third-party verification company 108, each connected to an internetwork 110 (e.g., the Internet) by physical network media 112(1-4) (e.g. telephone line, coaxial cable, etc.). Card-holder 102, merchant 104, credit card company 106, and verification company 108 are also in communication via another physical network media 114 (e.g. a telephone line).

Card-holder 102 possesses a credit card with a number identifying an account provided by credit card company 106. Merchant 104 offers goods or services which can be purchased via internetwork 110 by card-holder 102 using the credit card number. Card-holder 102 makes an electronic purchase request from merchant 104, by providing the entire credit card number. This purchase may be made over internetwork 110, physical network media 114, or even in person. Responsive to receipt of the purchase request, merchant 104 submits a transaction approval request (TAR) to credit card company 106.

The TAR then undergoes a two-part authorization before an approval or denial is issued to merchant 104. First, the purchase request undergoes standard credit approval by credit card company 106. Following credit approval, the purchase request is verified with card-holder 102 either by credit card company 106, or by verification company 108. Verification is executed either over internetwork 110 or physical network media 114. Following verification, if the purchase is both approved by credit card company 106 and verified by card-holder 102, an approval is transmitted to merchant 104 via physical network media 114 or internetwork 110.

In this particular embodiment a credit card facilitates electronic commerce. Those skilled in the art will realize that the present invention is not, however, limited to purchases made using credit cards. The present invention may be used in conjunction with any type of account (e.g. debit cards) to facilitate safe and secure electronic transactions that include transmission of an account number. It is further understood that in the following description, credit card company 106 executes the verification process. However, the verification process may optionally be performed by third party verification company 108. In such an embodiment, credit card company 106 transmits a verification request to verification company 108. Verification company 108 then verifies the transaction request with card-holder 102, and transmits indicia of verification (indicating whether the transaction request has been verified, disclaimed, etc.) back to credit card company 106.

Figure 2:
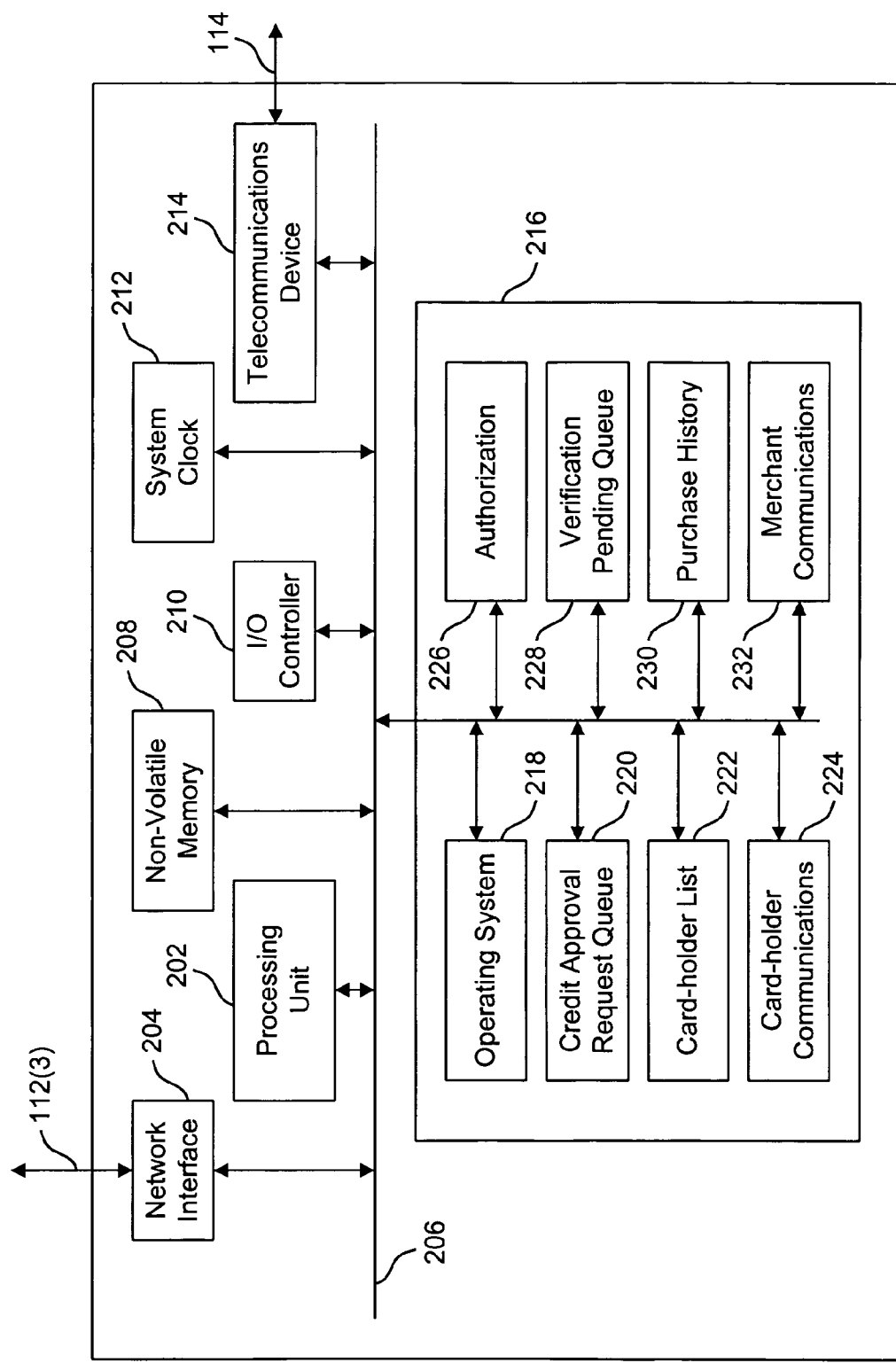
FIG. 2 is a block diagram showing a server of the credit card company of FIG. 1, to include a working memory and an authorization module within said working memory.

FIG. 2 is a block diagram of a server 200 (e.g. an HTTP Internet Server) connected to internetwork 110 via physical network media 112(3). In this particular embodiment server 200 is a transaction server of credit card company 106, for processing credit card transactions for credit card company 106. Server 200 includes a processing unit (PU) 202, a network interface 204, a system bus 206, non-volatile memory 208, at least one input/output (I/O) controller 210, a system clock 212, a telecommunications device 214, and a working memory 216. PU 202 executes data and code contained in working memory 216 to cause server 200 to carry out its intended functions (e.g. processing credit card transactions). System bus 206 facilitates intercommunication between the various components of server 200.

Server 200 communicates over Internetwork 110 via network interface 204. Network interface 204 (e.g. an Ethernet adapter card) transmits data packets onto and receives data packets from internetwork 110, thus allowing server 200 to communicate with card-holder 102 and merchant 104 via internetwork 110. Non-volatile memory 208 (e.g. read-only memory, or one or more hard disk drives) provides storage for data and code (e.g., boot code and programs) that are retained even when server 200 is powered down. I/O controller 210 manages connections for user interface devices (not shown) for a system administrator of server 200. I/O devices typically include a keyboard, mouse, monitor, printer, and other such devices that facilitate communications between server 200 and an administrator. Server 200 further includes a system clock 212 that maintains proper date and time, and provides date and time data upon request.

Server 200 further includes a telecommunications device 214 (e.g. a modem, or telephone) for establishing either a data or voice connection between a remote system or party and server 200. Examples of remote systems include a computer owned by card-holder 102, merchant 104, or verification company 108. In a particular embodiment, a voice connection with card-holder 102 is used to verify pending TARs.

Working memory 216 (e.g. random access memory) provides dynamic memory to server 200, and includes executable code (e.g. an operating system 218), which is loaded into working memory 216 during system start-up. Operating system 218 facilitates control and execution of all other modules loaded into working memory 216. Working memory 216 further includes a Credit Approval Request Queue (CARQ) 220, a card-holder list module 222, a card-holder communications module 224, an authorization module 226, a verification pending queue (VPQ) 228, a purchase history module 230, and a merchant communications module 232. Each of the foregoing modules and queues are initialized and loaded into working memory 216 at startup from non-volatile memory 208 using methods well known to those skilled in the art. Optionally, the foregoing modules and queues can be loaded into working memory 216 from alternate mass data storage devices including, but not limited to, a CD-ROM, a tape, or a drive having high capacity removable data storage disks (e.g. Iomega's Jaz™ or Zip™ drives).

Authorization module 226 controls and coordinates the approval and verification of TARs. As described above, in the alternate embodiment where verification is processed by third-party verification company 108, authorization module 226 is operative to transmit a request for verification to verification company 108 and receive indicia of verification from verification company 108. The transmitted request for verification would include information related to the purchase request such as a product description, purchase price, merchant's name, or any other information helpful to identify the transaction to the card-holder for verification. The received indicia of verification would include, for example, a code indicating that the particular transaction has been verified or disclaimed by the card-holder. Optionally, authorization module, responsive to instructions given by card-holder 102, is further operative to selectively disable the verification process (e.g., automatically verify every transaction or transactions for a particular merchant). Instructions to disable the verification process would generally be initiated by card-holder 102 over a secure network (e.g. via telephone or mail).

Merchant communications module 232 receives TARs from and transmits approvals or denials to merchant 104 via network interface 204 or telecommunications device 214. Card-holder Communications module 224 manages communications between server 200 and card-holder 102, via internetwork 110 or physical network media 114. Card-holder list module 222 is a database for storing personal and account information for current customers of credit card company 106, including card-holder 102. Those skilled in the art will understand that card-holder list module 222 would typically be a very large file. Therefore, while card-holder list module 222 is shown in memory 216, it should be understood that the entire customer files would likely be stored in a mass data storage system such as non-volatile memory 208, with portions of the entire list being swapped in and out of card-holder list 222 as necessary.

Credit Approval Request Queue (CARQ) 220 provides storage for pending TARs awaiting conventional credit approval by authorization module 226. Merchant communications module 232 periodically polls network interface 204 and telecommunications device 214 to determine whether there are any incoming TARs from merchant 104, and transfers any such requests to CARQ 220.

Verification Pending Queue (VPQ) 228 provides storage for pending TARs awaiting verification by card-holder 102. Authorization module 226 transfers TARs from CARQ 220 to VPQ 228 after the TAR is confirmed as corresponding to a valid account and passes conventional credit approval. TARs remain in VPQ 228 until verified, denied, or until the lapse of a predetermined time period.

Once a TAR is approved or denied, a record of the TAR is transferred to purchase history module 230. Purchase history module 230 stores information about previous account activity, for a predetermined time period (e.g. a period of thirty days). Upon lapse of the predetermined time period, at which point a written record (e.g. a bill, an e-bill, etc.) of the transaction has been conveyed to card-holder 102, each expired TAR is transferred from working memory 216 to a more permanent storage media (e.g., magnetic tape).

Figure 3:
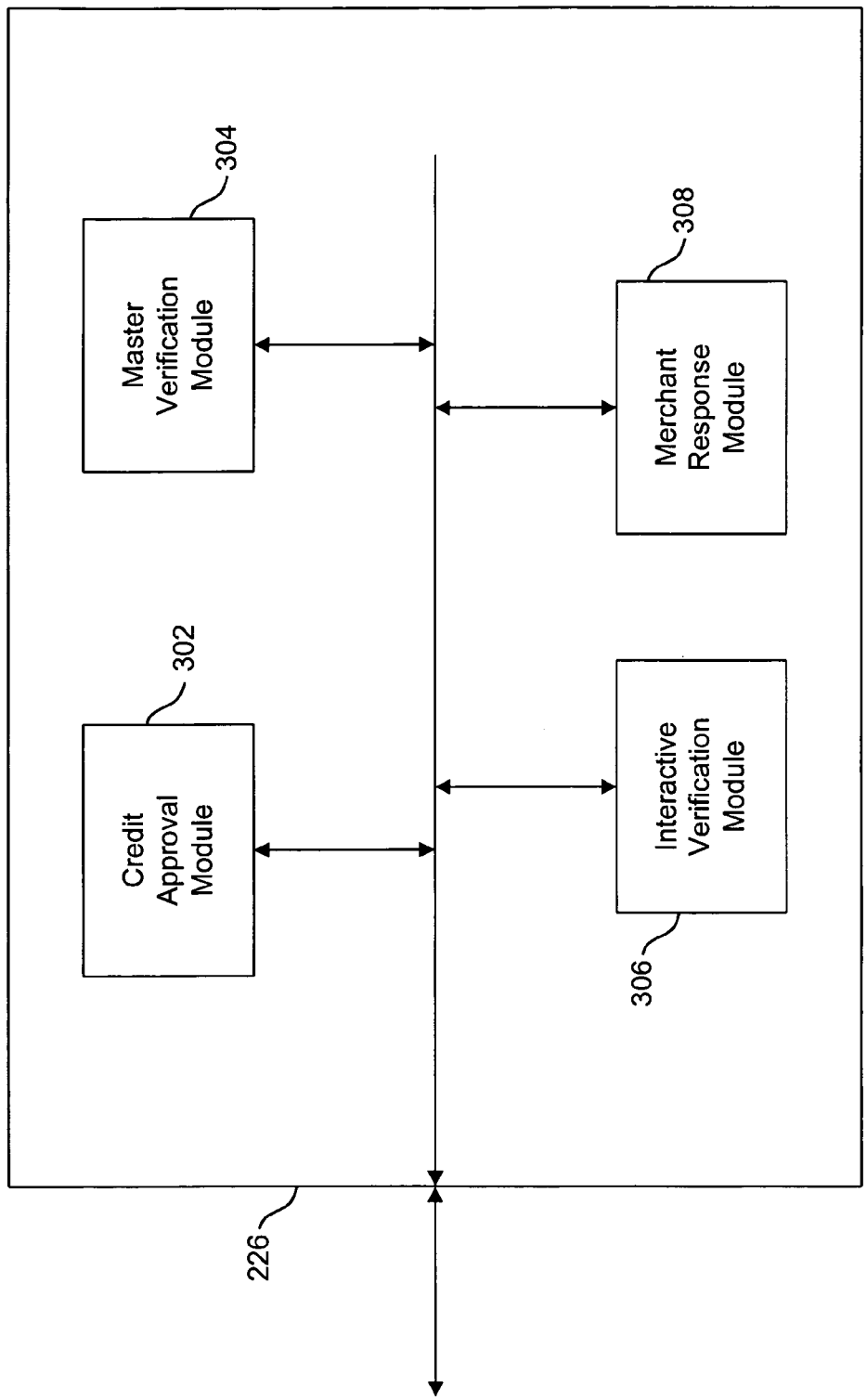
FIG. 3 is a block diagram detailing the authorization module shown in FIG. 2.

FIG. 3 shows a block diagram of authorization module 226 to include a credit approval module 302, a master verification module 304, an interactive verification module 306, and a merchant response module 308. Credit approval module 302 executes conventional credit approval for each TAR contained in CARQ 220 by means well known to those skilled in the art. Master verification module 304 coordinates the authorization and verification processes, and is responsible for overall control of authorization module 226. Interactive verification module 306 carries out verification with card-holder 102. Merchant response module 308 initiates final communication with merchant 104 by transmitting either a transaction approval or a transaction denial.

Figure 4:
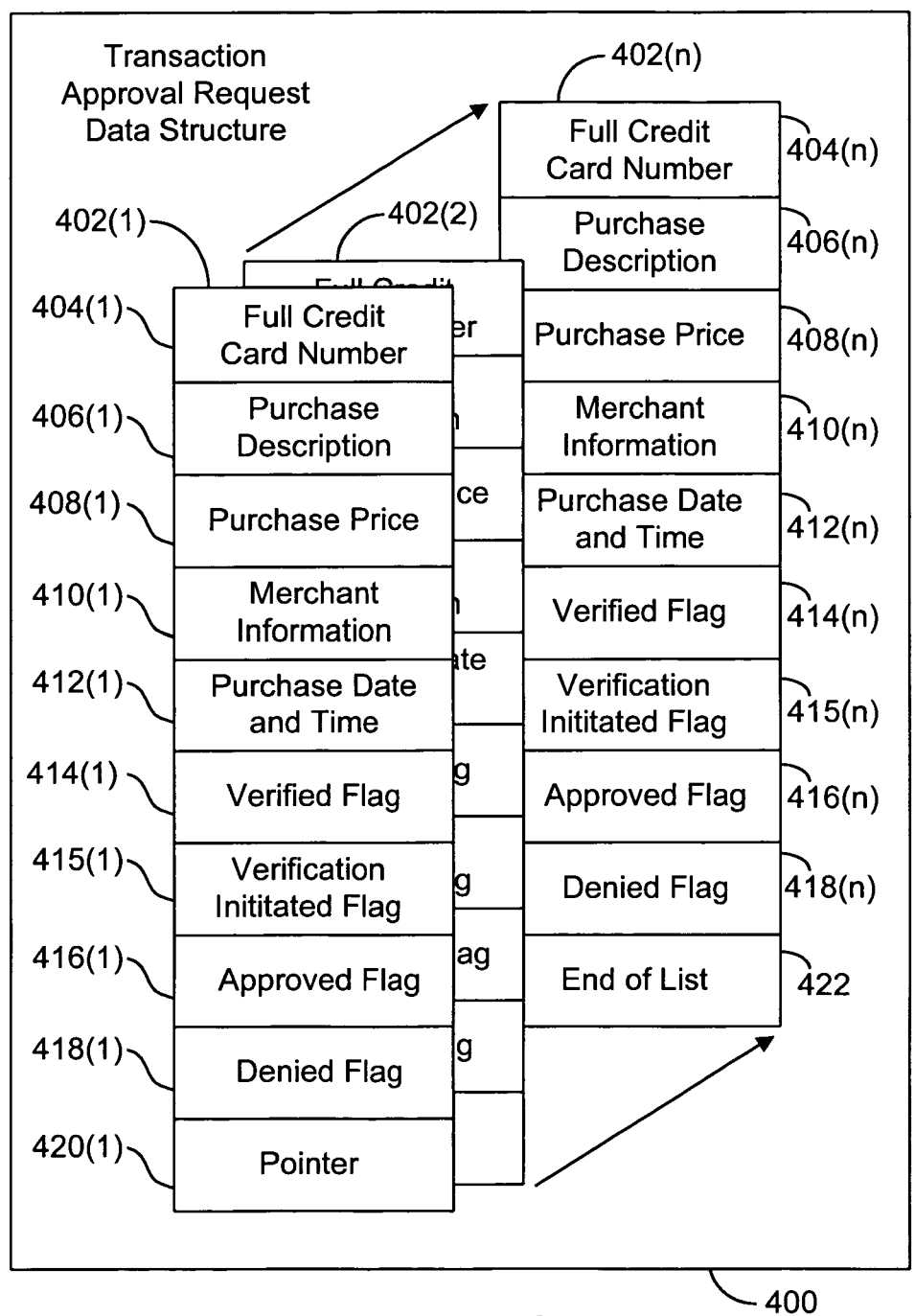
FIG. 4 is a block diagram showing exemplary data structures for storing transaction approval requests records in the Credit Approval Request Queue of FIG. 2.

FIG. 4 shows an example of a credit approval request data structure 400 suitable for use with a particular embodiment of the present invention. Those skilled in the art will recognize data structure 400 as a linked-list of records 402(1-n). Each of records 402(1-n) represents a pending TAR and includes a full credit card number 404, a purchase description 406, a purchase price 408, merchant information 410, purchase date and time information 412, a verified flag 414, a verification initiated flag 415, an approved flag 416, a denied flag 418, and a pointer 420. Full credit card number 404, purchase description 406, purchase price 408, merchant information 410, and purchase date and time information 412 are received by server 200 from merchant 104 with the TAR. Verified flag 414, approved flag 416, and denied flag 418 are used to indicate the status of each record 402 in the authorization process, as will be explained in greater detail below. Pointer 420 indicates the memory address of the next record 402(+1) in the list. The last record 402(n) includes an end of list value 422, that indicates that record 402(n) is the last record in the list.

Verified flag 414, verification initiated flag 415, approved flag 416, and denied flag 418 are single bit flags indicating the status of the respective record. Verified flag 414 indicates if the associated TAR has been verified (e.g. verified flag 414=1) or if the TAR is not verified (e.g. verified flag 414=0). Verification initiated flag 415 indicates whether server 200 has initiated the verification process with card-holder 102. Approved flag 416 indicates whether or not the associated TAR has been approved (e.g. approved flag=1). Denied flag 418 indicates whether the associated TAR has been denied (e.g. denied flag=1).

Figure 5:
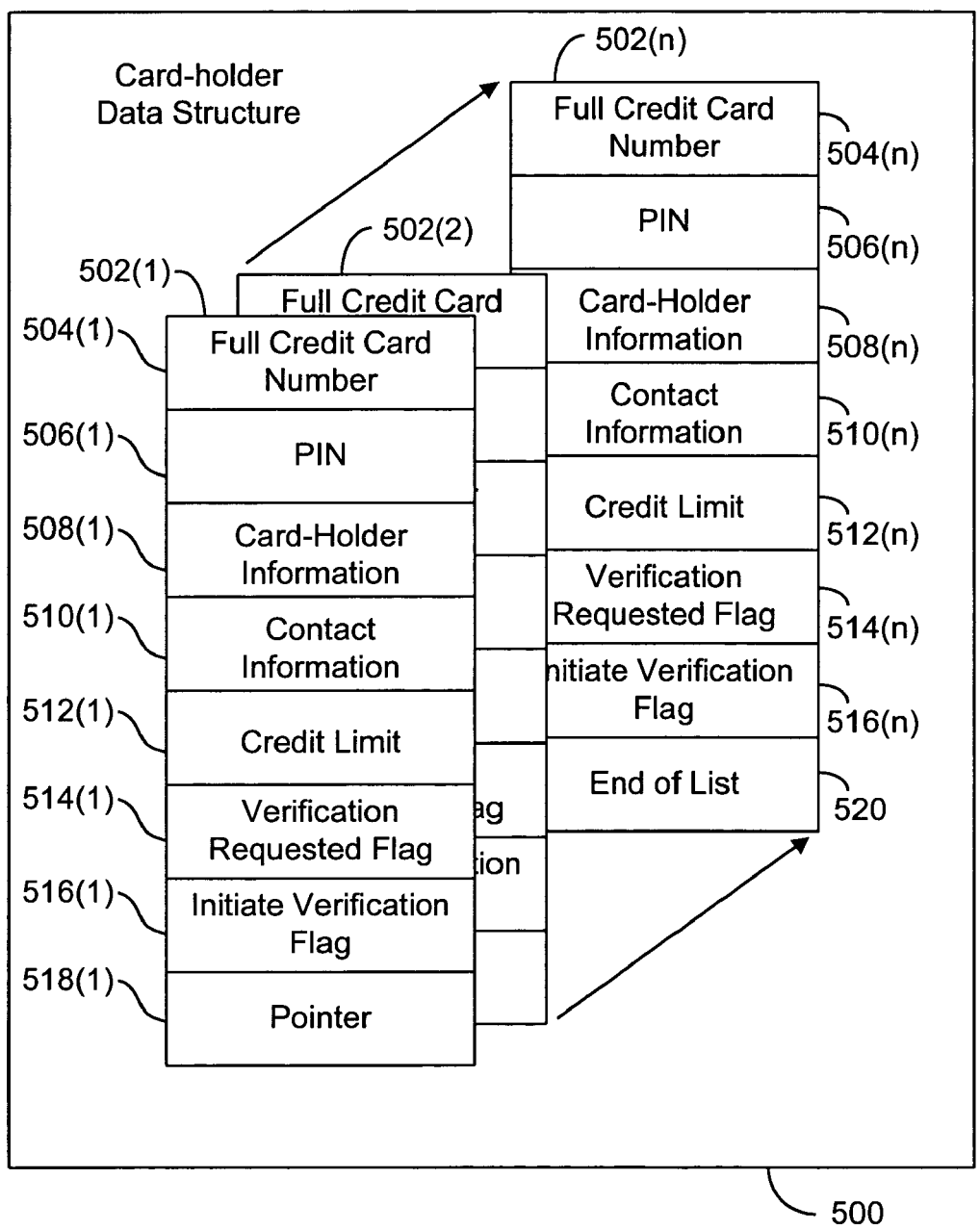
FIG. 5 is a block diagram showing exemplary data structures for storing card-holder data in the Card-holder List module of FIG. 2.

FIG. 5 shows an example of a card-holder data structure 500 suitable for storing card-holder data in card-holder list module 222. Those skilled in the art will recognize that data structure 500 is a linked list of records 502(1-n), with one record 502 for each valid credit account extended by credit card company 106. Each record 502 includes a full credit card number 504 issued to an associated card-holder, a personal identification number (PIN) 506, card-holder information 508, contact information 510, a credit limit 512, a verification requested flag 514, an initiate verification flag 516, and a pointer 518.

PIN 506 is a code used to authenticate card-holder 102 during the verification process or to allow card-holder 102 to set preference settings (e.g., verification requested flag 514, initiate verification flag 516, etc.). Card-holder information 508 includes, but is not limited to, such personal information as card-holder's first and last names, date of birth, social security number, and/or address. Contact information 510 comprises information necessary for communications with the associated card-holder, especially for TAR verification. Contact information 510 may include, but is not limited to, a telephone number, a pager number, or an e-mail address. Credit limit 512 indicates the prearranged credit limit for the associated card-holder. Verification requested flag 514 allows card-holder 102 to selectively disable the verification process by for example, automatically verifying subsequent TARs without further input from card-holder 102. In this embodiment, verification requested flag 514 is a single bit flag, wherein a value of 1 indicates that the verification process should be carried out, and a value of 0 indicates that the card-holder wishes to suspend the verification process. Single bit initiate verification flag 516 indicates whether card-holder 102 wishes server 200 to initiate the verification process, or if server 200 should wait for user 102 to initiate the verification process. If initiate verification flag 516 has a value of 1, interactive verification module 306 initiates the verification process with the associated card-holder (e.g. e-mail, automated telephone call, etc.). If initiate verification flag 516 has a value of 0, the associated card-holder must initiate verification (e.g., place telephone call to server 200, log onto server 200 via internetwork 110, etc.). Pointer 518 indicates the start address of the next record 502 in card-holder data structure 500. End of list indicator 520 indicates that record 502($n$) is last record in card-holder data structure 500.

Figure 6:
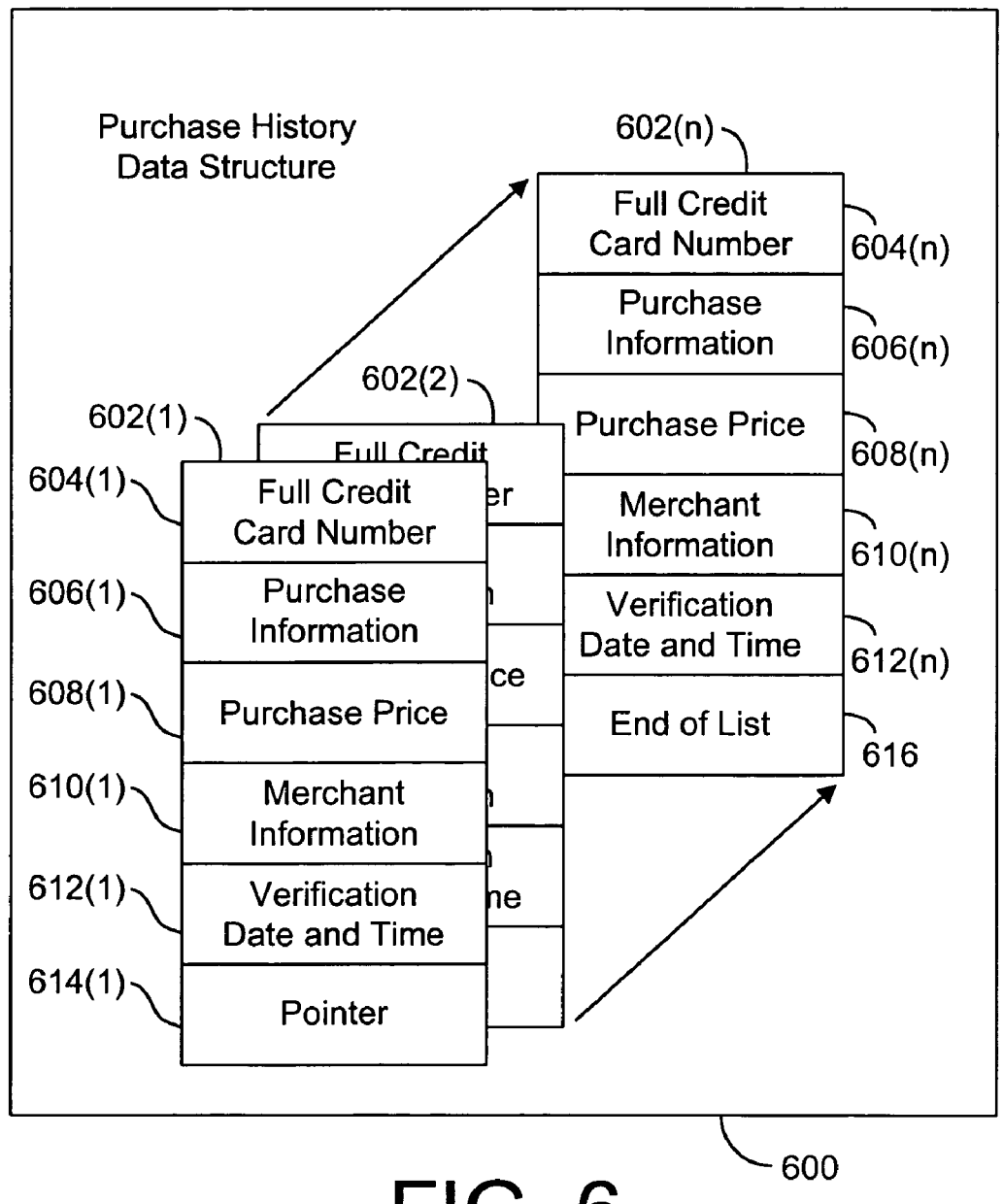
FIG. 6 is a block diagram showing exemplary data structures for storing transaction records in the Purchase History module of FIG. 2.

FIG. 6 shows an example of a purchase history data structure 606, suitable for use with a particular embodiment of the present invention. Purchase history data structure 600 is a linked-list of records 602(1–n), each of which includes a full credit card number 604, purchase information 606, a purchase price 608, merchant information 610, a verification date and time 612, and a pointer 614. Credit card number 604 identifies the particular transaction with the associated card-holder. Purchase information 606 includes information (e.g., product description) that will help identify the transaction to the card-holder. Purchase price 608 indicates the cost associated with the purchase. Merchant information 610 identifies the merchant that submitted the TAR. Verification date and time 612 indicates when, if at all, the associated card-holder verified the TAR. Pointer 614 indicates the address of the next record 602 in data structure 600. End of list indicator 616($n$) indicates that record 602($n$) is the last record in purchase history data structure 600.

Those skilled in the art will understand that the above-described credit approval request data structure 400, card-holder data structure 500, and purchase history data structure 600 are exemplary in nature, and that other data structures may, and likely will, be employed with the present invention. Accordingly, the particular data structures described herein by way of example are not considered to be essential elements of the present invention.

The operation of a particular embodiment of the present invention will now be explained with reference to FIGS. 1-6. The process begins when card-holder 102 submits an order for goods or services to merchant 104, and uses a credit card number assigned by credit card company 106 as the means of payment. Merchant 104 then transmits a transaction approval request to credit card company 106 including the credit card number supplied by card-holder 102, a description of the purchase, the purchase price, the purchase date and time, and information identifying merchant 104.

Merchant communications module 232 (FIG. 2) periodically polls network interface 204 and telecommunications device 214 for any incoming TARs from merchant 104. When a TAR is received, merchant communications module 232 scans card-holder list 222 to determine whether there is a record 502 (FIG. 5) with a credit card number 504 matching the credit card number provided with the TAR. If there is no such record in card-holder list 222, then merchant communications module 232 transmits a denial to merchant 104.

If, however, the submitted credit card number matches a credit card number 502($x$) in card-holder list 222, then merchant communications module 232 generates a credit approval request record 402 using the information provided in the TAR to create fields 404, 406, 408, 410, and 412, and stores the new record in CARQ 220. Initially, verified flag 414, approved flag 416, and denied flag 418 are all set equal to zero.

Master verification module 304 of authorization module 226 periodically scans CARQ 220 for pending TARs. Any pending TARs are processed based on the status of flags 414, 416, and 418. For example, if approved flag 416(1) of the first TAR record 402(1) is set equal to zero, then master verification module 304 calls credit approval module 302 to perform the conventional credit approval of TAR 402(1).

Credit approval module 302 performs the conventional credit approval process by means well know to those skilled in the art. Conventional credit approval typically comprises, but is not restricted to, credit approval module 302 comparing purchase price 408(1) and the associated card-holder's 102($x$) existing balance to card-holder's 102($x$) credit limit 512($x$). If the sum of purchase price 408(1) and card-holder's 102($x$) existing balance is less than or equal to credit limit 512($x$), then credit approval module 302 sets approved flag 416(1) equal to 1. If there are any outstanding discrepancies in the account (e.g., overdue payments), or if the sum of purchase price 408(1) and card-holder's 102($x$) existing balance is greater than credit limit 512($x$), then credit approval module 302 sets denied flag 418(1) equal to 1.

During the next scan of CARQ 220 master verification module 304 again checks flags 414(1), 416(1), and 418(1) to determine the appropriate action. Note that verified flag 414 (1) should still be equal to 0, because the TAR record 402(1) has not yet been processed for verification. If denied flag 418(1) is set equal to 1, then master verification module 304 calls merchant response module 308 to transmit a denial to merchant 104, removes record 402(1) from CARQ 220, and writes a record 602 of the denied transaction in purchase history module 230. If approved flag 416(1) is set equal to 1, then master authorization module 304 retrieves verification requested flag 514($x$) to determine whether card-holder 102 ($x$) has selectively disabled the verification process. If verification requested flag 514($x$) is set equal to 0, then master verification module 304 automatically sets verified flag 416 (1) equal to 1, and leaves TAR record 402(1) in CARQ 220. If verification requested flag 514($x$) is equal to 0, then master authorization module 304 transfers TAR record 402(1) to VPQ 228 to await verification by card-holder 102($x$).

Master verification module 304 also scans VPQ 228 periodically (e.g., after each scan of CARQ 220) to process any pending TAR records 402 in VPQ 228 for verification. If verified flag 414 of a particular record 402 is set equal to 1, it indicates that the TAR corresponding to record 402 has been verified by card-holder 102($x$). The first time TAR record 402(1) is scanned in VPQ 228, verified flag 414(1) and verification initiated flag 415(1) should both be set equal to 0. Master verification module 304 then retrieves record 502($x$) from card-holder list 222 to determine whether server 200 should initiate the verification process (e.g., send an e-mail to user 102($x$), page user 102($x$), place a call to user 102($x$), etc.), or whether server 200 should wait for user 102($x$) to initiate the verification process. If initiate verification flag 516($x$) is set equal to 0, then master verification module sets verification initiated flag 415(1) equal to 1. Setting the verification initiated flag equal to 1, eventhough server 200 has not initiated the verification process, eliminates the need to check verification requested flag 516(x) each time VPQ 228 is scanned by master verification module 304.

If, during the first scan of record 402(1) in VPQ 228, master verification module 304 determines that initiate verification flag 516(x) had been set equal to 1, then master verification module 304 calls interactive verification module 306 to initiate the verification process with card-holder 102(x). Interactive verification module 306 then initiates the verification process, sets verification initiated flag 415(1) equal to 1, and returns control to master verification module 304, which retrieves the next record 402 in VPQ 228 for processing.

Master verification module 304 also periodically calls interactive verification module 306 to conduct the actual verification of TARs pending in VPQ 228. Verification of pending TARs is accomplished by establishing a connection with card-holder 102(x) separate from the connection with merchant 104 over which the TAR was originally received, providing additional security compared to prior art electronic transactions such as ATM card purchases. As used herein, the phrase "establishing a connection" is understood to be interpreted in its broadest possible sense to include, but not be limited to, establishing a network connection, establishing a data connection over a modem, establishing a voice connection over a telecommunications device, sending or receiving e-mail, etc. Thus, card-holder 102 could verify pending transaction approval requests by logging onto server 200 via internetwork 110, making a direct modem connection with server 200 via network 114, dialing into server 200 via a telephone, sending an e-mail to server 200, responding to an e-mail from server 200, or any other form of electronic communication.

In an alternate embodiment, system 200 can be modified to allow account-holder 102 to preapprove certain charges. For example, card-holder list 222 could include a field for preapproved merchants (or any other desirable criteria). Then, when a transaction approval request is processed, authorization module 226 can compare the merchant identification to the associated card-holder's preapproved merchant's list, and, if the merchant appears on the list, automatically verify the TAR. Card-holder 102 could access system 200 to modify such preapproved lists via internetwork 110, network 114, or any other means known for updating customer data.

In the particular embodiment of the present invention shown in FIGS. 1-3, interactive verification module 306 communicates with card-holders 102 via card-holder communications module 224 and network interface 204 and telecommunications device 214. Card-holder communications module 224 periodically polls network interface 204 and telecommunications device 214 for incoming connection requests (e.g., e-mail, network connection, phone call, etc.) and establishes any such connections. Such communications programs (e.g., e-mail software, network protocols, etc) are well known to those skilled in the art, and are not therefore described in detail so as not to unnecessarily obscure the present invention.

Interactive verification module 306 polls card-holder communications module 224 to determine whether there are any established connections with card-holders 102, and processes each established connection. Assuming card-holder 102(x) has established a connection with server 200, the verification of pending TARs proceeds as follows. The connection request should identify card-holder 102(x) (e.g., by credit card number), and optionally includes an authentication code (e.g., a personal identification number (PIN)) to authenticate card-holder 102(x). Interactive verification module 306 uses the identification information in the connection request to retrieve record 502(x) corresponding to card-holder 102(x) from card-holder list 222. Then, interactive verification module 306 compares the PIN provided in the connection request with PIN 506(x) to authenticate the card-holder. If the PINs do not match, the connection is terminated. If the PINs match, the verification process proceeds.

Those skilled in the art will understand that the connection with card-holder 102(x) need not be terminated the first time an incorrect PIN is received. For example, conventional network security systems typically allow a predetermined number of incorrect entries prior to disconnecting a user. Alternatively, security measures such as stalling the user attempting to access the system, while a trace of the connection is initiated, can be employed.

Next, interactive verification module 306 scans verification pending queue 228 for all TARs with a credit card number 402 matching credit card number 504(x) of card-holder 102(x). Each matching TAR is then presented to card-holder 102(x) to be verified disclaimed. If card-holder 102(x) verifies a particular transaction, then interactive verification module 306 sets the verified flag 414 of that TAR record to equal 1. If card-holder 102(x) disclaims the transaction (e.g., because the purchase was unauthorized), then interactive verification module 306 sets the denied flag 418 of the TAR record to equal 1.

There are many possible ways to present pending TARs to card-holder 102(x) and to receive verification instructions from card-holder 102(x), depending on the type of connection established with server 200. For example, if card-holder 102 establishes an HTTP connection with server 200, then pending TARs could be presented in the form of an interne web page. Alternatively, if the connection between card-holder 102(x) and server 200 is a telephone voice connection, then pending TARs can be presented to card-holder 102(x) via an automated text to speech system, such as are well known in the art. Card-holder 102(x) could then transmit verification instructions via voice or keypad commands (e.g. touching button 1 to verify, or touching button 2 to disclaim). As yet another example, in the case where the connection request is in the form of an e-mail response, the e-mail response can include verification instructions (e.g., in the subject line of the e-mail) that can be automatically processed by interactive verification module 306. While using any of the above-described types of connections to verify TARs is considered to be a novel aspect of the present invention, no particular type of connection is considered to be an essential element of the present invention.

After interactive verification module 306 has processed any connection requests, control is returned to master verification module 304, which scans VPQ 228 and transfers any TAR records whose verified flag 414 or denied flag 418 has been set equal to 1. Additionally, master verification module 304 scans all records 402 remaining in VPQ 228, and compares the value in the purchase date and time field 412 with the date and time provided by system clock 212. If the resulting time difference exceeds a predetermined time interval (e.g., 24 hours), then master verification module 304 sets the denied flag 418 of the associated record 402 equal to 1 and transfers the record 402 to CARQ 220.

During the next scan of CARQ 220, master verification module 304 will locate any TAR records that have both verified flag 414 and approved flag 416 set equal to 1, call merchant response module to transmit an approval to the merchant identified in field 410 of the record, remove the record from CARQ 220, and write a record 602 into purchase history data 230 to document the completed transaction. Records whose denied flags 418 are found to be set equal to 1 are handled similarly, except that a denial is transmitted to the identified merchant instead of an approval.

Figure 7:
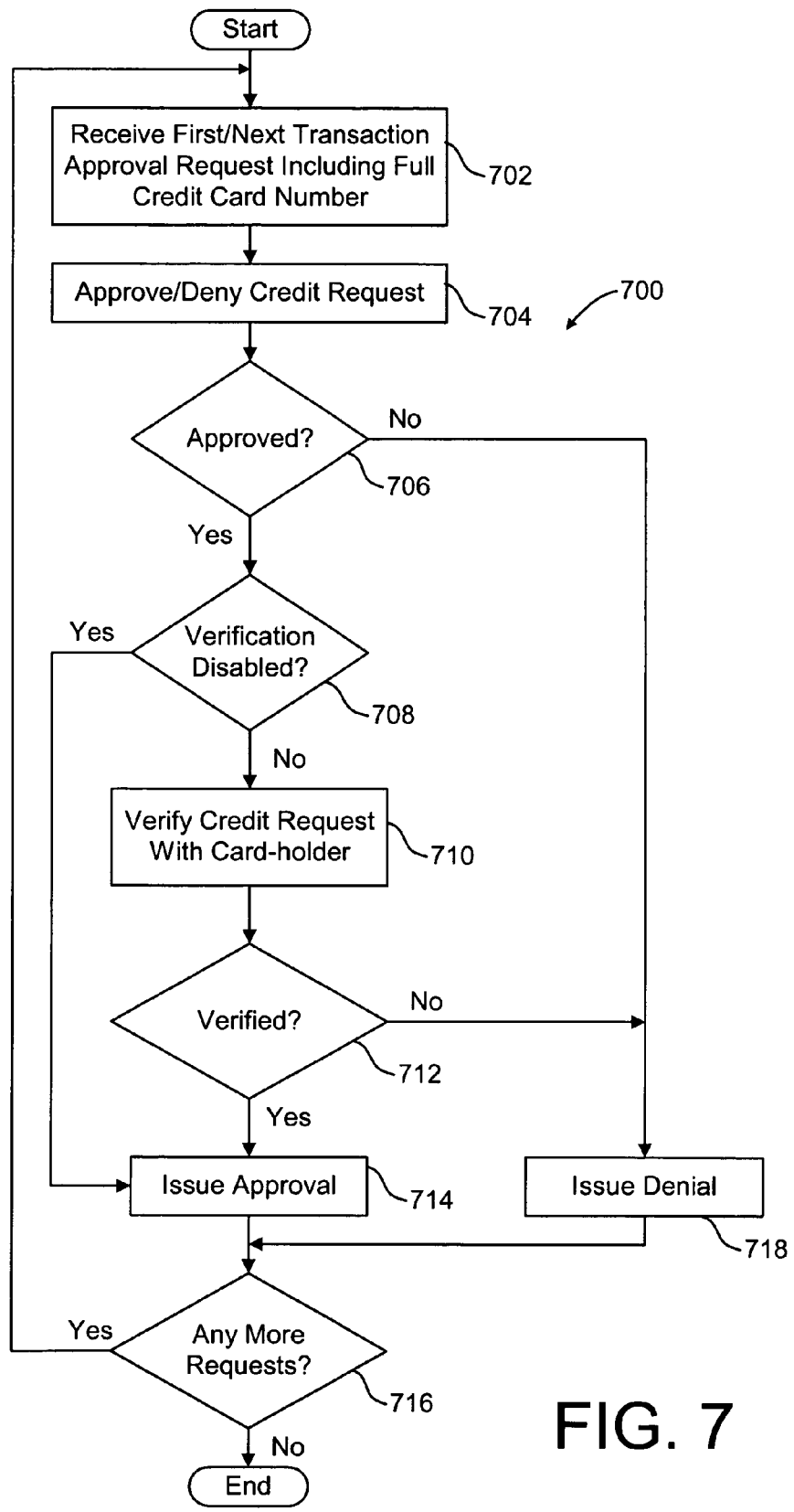
FIG. 7 is a flowchart summarizing one method of providing safe and secure electronic transactions according to the present invention.

FIG. 7 is a flowchart summarizing a method 700 of processing a TAR in accordance with the present invention. In a first step 702 merchant communications module 232 receives a TAR including a full credit card number from a merchant 104, generates a TAR record 402, and writes TAR record 402 into CARQ 220. In a second step 704 authorization module 226 subjects TAR record 402 to a conventional credit approval process, and sets approved flag 416 or denied flag 418 to indicate whether the requested credit is approved or denied. In a third step 706, authorization module 226 determines from flags 416 and 418 whether the requested credit has been approved or denied. If in third step 706, authorization module 226 determines that the requested credit has been approved, then in a fourth step 708 authorization module 226 determines whether card-holder 102 has selectively disabled the verification process. If the verification process has not been selectively disabled, then in a fifth step 710 authorization module 226 verifies the transaction with card-holder 102. Then, in a sixth step 712 authorization module 226 determines whether the TAR has been verified by card-holder 102. If the TAR has been verified, then in a seventh step 714 merchant communications module 232 transmits a transaction approval to merchant 104. Next, in an eighth step 716, authorization module 226 determines whether there are any more TAR records in CARQ 220. If there are no more records in CARQ 220, then method 700 ends.

If in third step 706 authorization module 226 determines that the credit request has been denied, then method 700 proceeds to a ninth step 718 where merchant communications module 232 transmits a denial to merchant 104. If in fourth step 708, authorization module 226 determines that the verification process has been selectively disabled, then method 700 proceeds to seventh step 714 where merchant communications module 232 transmits an approval to merchant 104. If in sixth step 712, authorization module 226 determines that the TAR has not been verified by card-holder 102, then method 700 proceeds to ninth step 718 where merchant communications module 232 transmits a denial to merchant 104. Finally, if in eighth step 716, authorization module 226 determines that there are more pending TAR records in CARQ 220, then method 700 returns to first step 702 to process the next record in CARQ 220.

Figure 8:
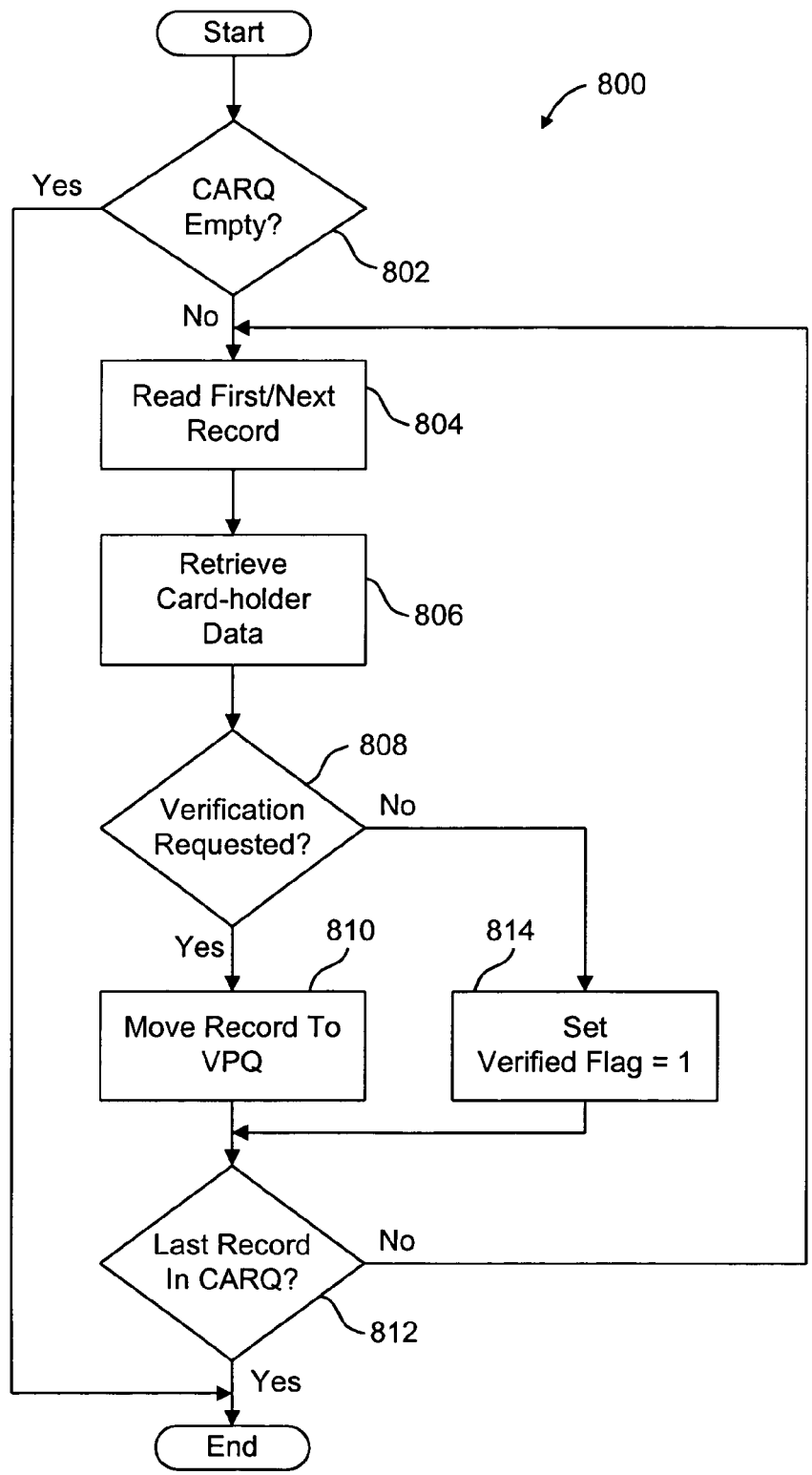
FIG. 8 is a flowchart summarizing one method of performing the fourth step (verification disabled?) of the method of FIG. 7.

FIG. 8 is a flowchart summarizing a method 800 for implementing the selective disabling of the TAR verification process according to a particular embodiment of the present invention. In a first step 802, authorization module 226 determines if CARQ 220 is empty. If CARQ 220 is not empty, then in a second step 804 authorization module 226 reads the first TAR record in CARQ 220. Then, in a third step 806, authorization module 226 associates the first TAR with a card-holder 102 and retrieves a card-holder record 502 corresponding to the particular card-holder from card-holder list 222. In a fourth step 808, authorization module 226 determines from card-holder record 502 whether card-holder 102 has requested that TARs be verified with card-holder 102 prior to transmitting an approval to merchant 104. If it is determined that card-holder verification is requested (i.e., enabled), then in a fifth step 810 authorization module 226 transfers the associated TAR record to VPQ 228. Next, in a sixth step 812, authorization module 226 determines whether the last record in CARQ 220 has been processed, and if so then method 800 ends.

If, in fourth step 808, authorization module 226 determines that verification is not required (i.e., disabled), then in a seventh step 814 verified flag 414 is automatically set to 1 to indicate that the TAR has been verified. If in sixth step 812, authorization module 226 determines that the last record in CARQ 220 has not been processed, then method 800 returns to second step 804 to begin processing the next record in CARQ 220.

Figure 9:
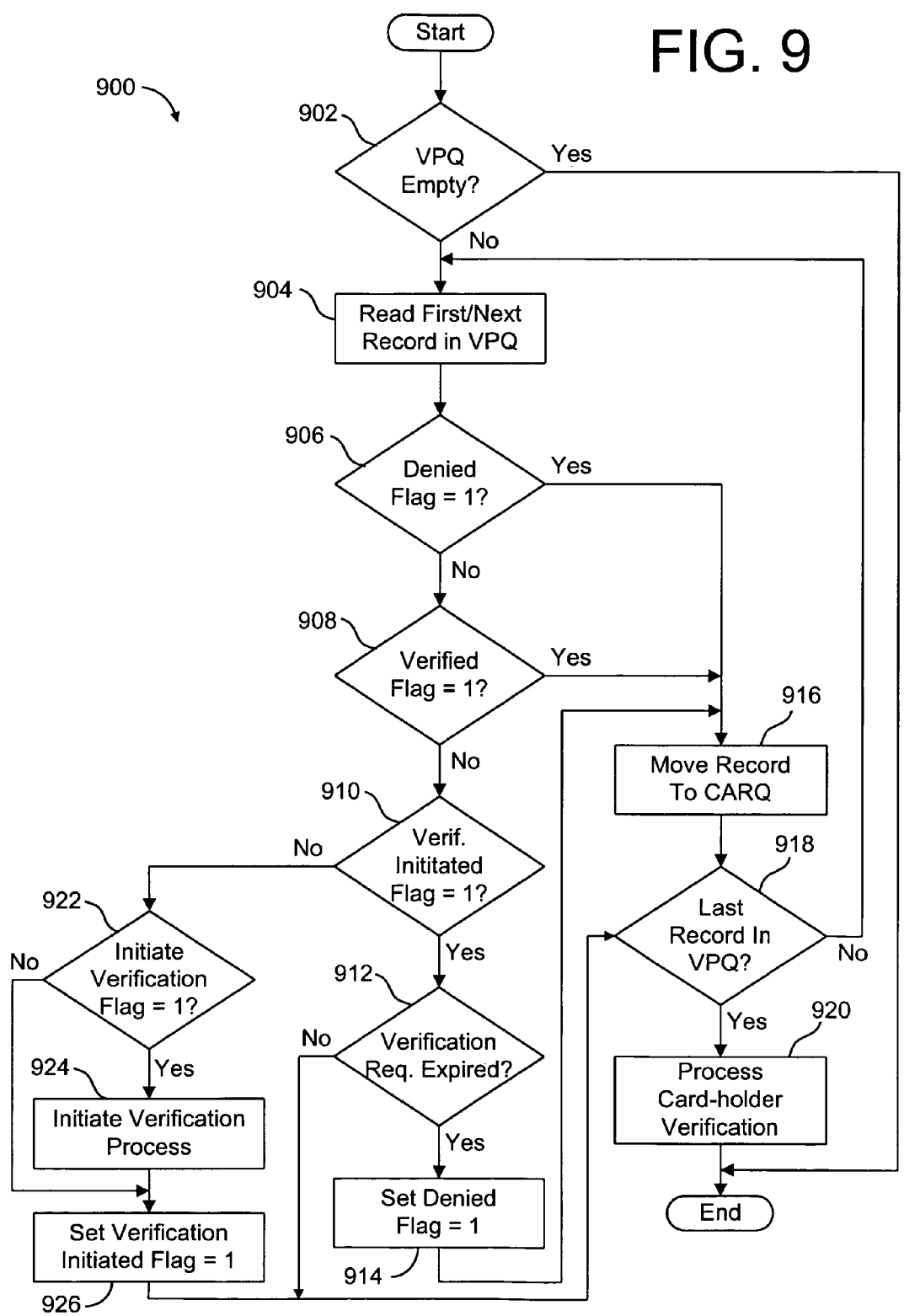
FIG. 9 is a flowchart summarizing one method of performing the fifth step (card-holder verification) of the method of FIG. 7.

FIG. 9 is a flowchart summarizing a particular method 900 for verifying a TAR in accordance with the present invention. In a first step 902 authorization module 226 determines whether VPQ 228 is empty. If VPQ 228 is not empty, then in a second step 904 authorization module 226 reads the first TAR record 402 in VPQ 228. In a third step 906 authorization module 226 determines whether TAR record 402 has been previously denied (e.g., denied flag 418=1). If TAR record 402 has not been previously denied, then in a fourth step 908 authorization module 226 determines if the current TAR has been previously verified (e.g. verified flag 414=1). If the TAR has not yet been verified, then in a fifth step 910 authorization module 226 determines whether the verification process has already been initiated by server 200 (e.g., verification initiated flag 415=1). If the verification initiated flag 415 is equal to 1, then in a sixth step 912 authorization module 226 determines if there has been a lapse of a predetermined time period since the current TAR was received by server 200 (e.g. read purchase date and time 412 and compare to system clock 212). If the predetermined time period has lapsed, then in a seventh step 914 authorization module 226 automatically disclaims the TAR (e.g. sets denied flag=1), and, in an eighth step 916, transfers the TAR record to CARQ 220. In a ninth step 918 authorization module 226 determines if the last record in VPQ 228 has been processed. If all the records in VPQ have been processed, then in a tenth step 920 authorization module 226 performs the card-holder verification process for any TAR records remaining in VPQ 228.

If, in first step 902, authorization module 226 determines that VPQ 228 is empty, then method 900 ends. If, in third step 906, authorization module 226 determines that the TAR record being processed has been denied, then method 900 proceeds directly to eighth step 916. Similarly, if in fourth step 908 authorization module 226 determines that the TAR record being processed has been previously verified, then method 900 proceeds to eighth step 916.

If in fifth step 910, authorization module 226 determines that verification initiated flag 415 is equal to 0, then method 900 proceeds to an eleventh step 922 where authorization module 226 further determines whether the verification process should be initiated by authorization module 226 (e.g. initiate verification flag 516=1). If, in eleventh step 922, authorization module 226 determines that it is to initiate the verification process with card-holder 102, then in a twelfth step 924 server 200 initiates the verification process with card-holder 102, and in a thirteenth step 926 sets the initiated verification flag equal to 1. Then, method 900 proceeds to eighth step 916. If, in eleventh step 922, authorization module 226 determines that the initiate verification flag 516 is set equal to 0, then method 900 proceeds directly to thirteenth step 926.

If in sixth step 912 authorization module 226 determines that the predetermined time interval has not lapsed, then method 900 proceeds to eighth step 916. If, in ninth step 918, authorization module 226 determines that there are additional TAR records in VPQ 228, then method 900 returns to second step 904 to process the next TAR record.

Figure 10:
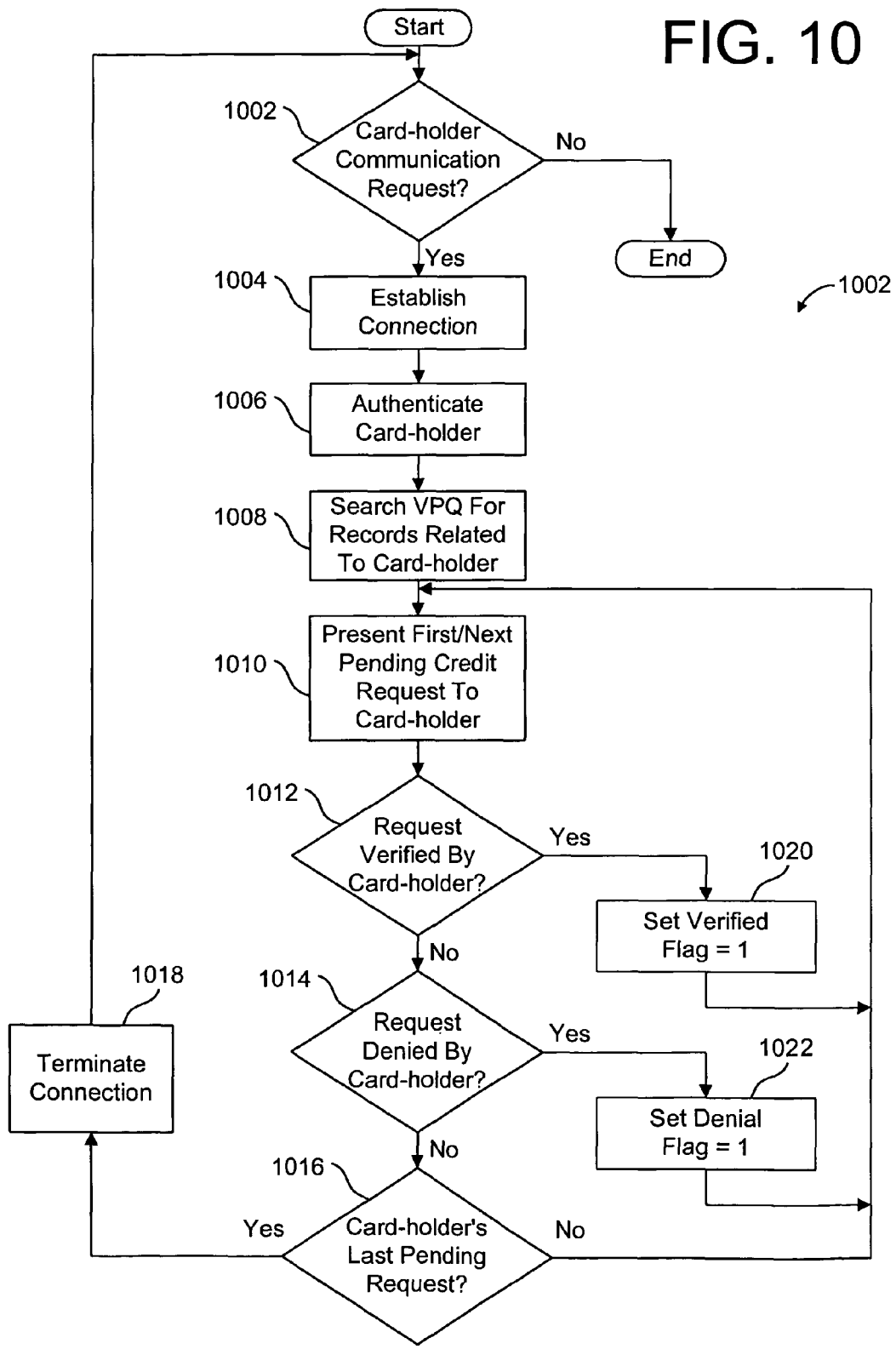
FIG. 10 is a flowchart summarizing an alternate method of performing the fifth step (card-holder verification) of the method of FIG. 7.

FIG. 10 is a flowchart summarizing a method 1000 of verifying pending TARs with card-holder 102. In a first step 1002, card-holder communications module 224 polls network interface 204 and telecommunications device 214 to determine whether there are any card-holder communication requests (e.g. a telephone call, network connection requests, etc.) from card-holder 102, and if so then in second step 1004, authorization module 226 calls interactive verification module 306 to establish a connection with card-holder 102. In a third step 1006, interactive verification module 306 authenticates card-holder 102 (e.g. requires an authentication code), and in a fourth step 1008 searches VPQ 228 for records related to card-holder 102. Then, in a fifth step 1010, interactive verification module 306 presents at least a portion of a pending TAR (sufficient for card-holder recognition) to card-holder 102. Next, in a sixth step 1012, interactive verification module polls the established connection to determine whether card-holder 102 has transmitted instructions to verify the presented TAR. If there are no instructions from card-holder 102 to verify the TAR, then in a seventh step 1014 interactive verification module 306 determines whether card-holder 102 has transmitted instructions to disclaim the TAR. If there are no instructions to disclaim the TAR, then in an eighth step 1016 interactive verification module 306 determines whether the last pending TAR associated with card-holder 102 has been processed. If the last pending TAR has been processed, then in a ninth step 1018 interactive verification module 306 terminates the established connection with card-holder 102, and method 1000 returns to step 1002 to determine whether there are any communication requests from other card-holders. If, in first step 1002, card-holder communications module 224 determines that there are no card-holder communication requests, then method 1000 ends.

If in sixth step 1012, interactive verification module 306 receives instructions from card-holder 102 to verify the presented TAR, then in a tenth step 1020 interactive verification module 306 sets verified flag 414 of the TAR record 402 to a value of 1, indicating the TAR has been verified. Then, method 1000 returns to fifth step 1010. Similarly, if in seventh step 1014, interactive verification module 306 receives instructions from card-holder 102 to disclaim the presented TAR, then in an eleventh step 1022 interactive verification module 306 sets denied flag 418 of the TAR record 402 to a value of 1, indicating the TAR has been disclaimed. Then, method 1000 returns to fifth step 1010.

If, in eighth step 1016, interactive verification module 306 determines that the last pending request for the particular card-holder has not been processed, then method 1000 returns to fifth step 1010 to process the next pending TAR for the particular card-holder.

The description of particular embodiments of the present invention is now complete. Many of the described features may be substituted, altered or omitted without departing from the scope of the invention. For example, the present invention may be implemented in conjunction with alternate types of accounts (e.g. debit accounts) requiring secure processing in addition to the credit card type account described herein. As another example, a third party verification company 108 may employ the transaction processing methods described herein on behalf of credit card company 106, and then transmit indicia of verification to credit card company 106. These and other deviations from the particular embodiments shown will be apparent to those skilled in the art, particularly in view of the foregoing disclosure.

I claim:

1. In a computer system, a method for verifying a commercial transaction between a user with credit card data and a merchant, said method comprising:

receiving instructions from an account-holder associated with said credit card data to selectively disable a previously enabled verification function;

receiving a transaction approval request from said merchant;

transmitting an approval to said merchant without verifying said transaction approval request with said account-holder responsive to the selectively disabled verification function;

receiving instructions from said account-holder to selectively enable said verification function;

receiving a subsequent transaction approval request from another merchant;

electronically verifying said subsequent transaction approval request with said account-holder, responsive to the selectively enabled verification function, via a communication with said account-holder separate from said communication with said another merchant; and transmitting an approval to said another merchant only if said subsequent transaction approval request is verified by said account-holder or if said verification function has again been disabled.

2. A method according to claim 1, wherein said step of verifying said subsequent transaction approval request with said account-holder includes prompting said account-holder to verify said transaction approval request.

3. A method according to claim 2, wherein said step of prompting said account-holder includes sending an electronic message to said account-holder.

4. A method according to claim 3, wherein said step of verifying said subsequent transaction approval request with said account-holder includes receiving a reply to said electronic message.

5. A method according to claim 2, wherein said step of prompting said account-holder includes placing an automated telephone call to said account-holder.

6. A method according to claim 5, wherein said step of placing an automated telephone call to said account-holder includes:

establishing a telephone connection with said account-holder;

reciting at least a portion of said subsequent transaction approval request to said account holder; and receiving verification instructions from said account-holder with respect to said subsequent transaction approval request.

7. A method according to claim 6, wherein said step of placing an automated telephone call to said account-holder further includes receiving an authentication code from said account-holder prior to said step of reciting at least a portion of said subsequent transaction approval request to said account holder.

8. A method according to claim 1, wherein said step of electronically verifying said subsequent transaction approval request with said account-holder includes disabling any notification to said account-holder and waiting for said account-holder to initiate communication with said computer system.

9. A method according to claim 8, wherein said communication with said computer system is initiated by said account-holder via a network connection.

10. A method according to claim 8, wherein said step of electronically verifying said subsequent transaction approval request with said account-holder includes:

receiving a connection request from said account-holder via a network;

establishing a network connection with said account-holder;

authenticating said account-holder;

transmitting at least a portion of said subsequent transaction approval request to said account-holder; and receiving verification instructions from said account-holder with respect to said subsequent transaction approval request.

11. A method according to claim 8, wherein said communication with said computer system is initiated by said account-holder via a telephone connection.

12. A method according to claim 8, wherein said step of electronically verifying said subsequent transaction approval request with said account-holder includes:

receiving a telephone call from said account-holder;

authenticating said account-holder;

reciting at least a portion of said subsequent transaction approval request to said account-holder; and receiving verification instructions from said account-holder with respect to said transaction approval request.

13. A method according to claim 1, wherein said step of electronically verifying said subsequent transaction approval request with said account-holder includes automatically disclaiming said approval request if said subsequent transaction approval request is not verified by said account-holder within a predetermined time interval.

14. A method according to claim 13, further comprising transmitting notice to said account-holder when said subsequent transaction approval request is disclaimed.

15. A method according to claim 1, wherein said step of electronically verifying said subsequent transaction approval request with said account-holder includes:

transmitting a verification request identifying said subsequent transaction approval request to a third-party for verification of said subsequent transaction approval request with said account-holder; and receiving indicia of verification from said third-party indicating whether said account-holder verified said subsequent transaction approval request.

16. A computer system for verifying a commercial transaction between a user with credit card data and a merchant, said computer system comprising:

a processing unit for processing data and code;

memory for storing said data and said code, said code including a merchant communications module operative to facilitate a connection with said merchant for receiving a transaction approval request, an account-holder communications module operative to facilitate a separate connection with an account-holder associated with said credit card data for said account-holder to verify said transaction approval request, and an authorization module responsive to receipt of said transaction approval request and operative to transmit an approval to said merchant if said transaction approval request is verified, said authorization module being configurable to cooperate with said account-holder communication module for obtaining account-holder verification of said transaction approval request or to automatically verify said transaction approval request without obtaining verification from said account-holder, said authorization module including an interactive verification module operative to wait for said account-holder to initiate said connection with said account-holder communication module, any prior notification to said account-holder regarding said transaction being disabled.

17. In a computer system, a method for verifying a commercial transaction between a user with credit card data and a merchant, said method comprising:

receiving a transaction approval request from said merchant;

electronically verifying said transaction approval request with an account-holder associated with said credit card data via a communication with said account-holder separate from said communication with said merchant, said electronic verification including disabling any notification to said account-holder and waiting for said account-holder to initiate communication with said computer system;

enabling the account-holder to disable the step of electronically verifying;

automatically verifying the transaction approval request, if the account-holder has disabled the step of electronically verifying; and transmitting an approval to said merchant if said transaction approval request is verified.

18. A computer-readable medium having code embodied therein for causing an electronic device to perform the method of claim 17.

* * * * *